(12) United States Patent
Brombach et al.

(10) Patent No.: US 11,686,287 B2
(45) Date of Patent: Jun. 27, 2023

(54) METHOD OF OPERATING AT LEAST ONE WIND TURBINE, AND DEVICE THEREFOR

(71) Applicant: Wobben Properties GmbH, Aurich (DE)

(72) Inventors: Johannes Brombach, Berlin (DE); Swantje Amelsberg, Berne (DE); Christoph Klein, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/311,138

(22) PCT Filed: Dec. 5, 2019

(86) PCT No.: PCT/EP2019/083861
§ 371 (c)(1),
(2) Date: Jun. 4, 2021

(87) PCT Pub. No.: WO2020/115229
PCT Pub. Date: Jun. 11, 2020

(65) Prior Publication Data
US 2022/0018333 A1    Jan. 20, 2022

(30) Foreign Application Priority Data
Dec. 6, 2018   (DE) .................... 10 2018 131 188.5

(51) Int. Cl.
*F03D 7/00*     (2006.01)
*F03D 7/02*     (2006.01)
*H02J 3/38*     (2006.01)

(52) U.S. Cl.
CPC ............ *F03D 7/0284* (2013.01); *H02J 3/381* (2013.01); *H02J 2300/28* (2020.01)

(58) Field of Classification Search
CPC . F03D 7/0284; F03D 7/00; F03D 7/02; F03D 7/0292; F03D 7/04; F03D 7/048; F05B 2270/1033; F05B 2270/337; F05B 2270/20; F05B 2270/332; G06Q 50/06; H02J 3/381; H02J 2300/28; Y02E 10/72
See application file for complete search history.

(56) References Cited

U.S. PATENT DOCUMENTS

2013/0204447 A1    8/2013  Bjerge et al.
2018/0173215 A1*   6/2018  Spruce .................... F03D 7/047
(Continued)

FOREIGN PATENT DOCUMENTS

EP    2557311 A1 *   2/2013   ........... F03D 7/0292
EP    2557311 A1     2/2013
(Continued)

*Primary Examiner* — Julio C. Gonzalez
(74) *Attorney, Agent, or Firm* — Seed IP Law Group LLP

(57) ABSTRACT

A method of operating at least one wind turbine including: receiving a first signal which is indicative of a level of a remuneration for electrical energy, which is fed currently and/or in the future into a grid to which the wind turbine is connected, producing a control signal dependent on the first signal, and controlling the wind turbine with the control signal for generating power of the wind turbine, that is dependent on the control signal. A wind turbine and a central control for carrying out such a method and a system comprising a central control and a plurality of wind turbines.

15 Claims, 3 Drawing Sheets

(56) References Cited

U.S. PATENT DOCUMENTS

2018/0187648 A1* 7/2018 Spruce .................. F03D 7/0292
2018/0331643 A1* 11/2018 Ganireddy .............. H02P 9/007

FOREIGN PATENT DOCUMENTS

| GB | 2484266 A | 4/2012 | |
| WO | WO-2011009958 A2 * | 1/2011 | ........... F03D 7/0224 |
| WO | 2012/041327 A2 | 4/2012 | |
| WO | 2013/023702 A1 | 2/2013 | |

* cited by examiner

METHOD OF OPERATING AT LEAST ONE WIND TURBINE, AND DEVICE THEREFOR

BACKGROUND

Technical Field

The invention concerns the field of wind turbines. Wind turbines are generally known and serve to take kinetic energy from the wind and convert it into electrical energy in order to feed it into an electric grid.

Description of the Related Art

Such wind turbines have a generator and an aerodynamic rotor involving an adjustable speed of rotation. In that respect the aerodynamic rotor is to be distinguished from an electrodynamic rotor which is part of the generator. It is known for the rotary speed of the aerodynamic rotor to be adjusted or altered by adjustment of the angles of the rotor blades of the aerodynamic rotor and/or by adjustment of an exciter field in the case of an externally excited generator. Depending on different blade angles or different exciter fields a wind turbine can accordingly feed a different level of electrical energy into an electric grid with given constant wind conditions.

Usually such a wind turbine is operated at an optimum operating point in relation to the respectively prevailing wind conditions. The prevailing wind conditions relate in particular to the prevailing wind speeds, which as a simplification can be considered as the single feature of the prevailing wind conditions. In reality further conditions like for example the gustiness of the wind or also the density of the air would have to be taken into consideration, but this can be factored out for the sake of simplicity. Basically therefore an optimum operating point can be associated with each wind speed. In that respect an optimum operating speed is to be interpreted as being one at which the wind turbine takes as much energy as possible from the wind and feeds it into the electric grid, in which respect however boundary conditions are to be taken into consideration at the same time like in particular the stability of the operating point and the turbine loading, in particular including turbine wear. Such an optimum operating point, which is sufficient for the purposes of description hereinafter, is in particular characterized by a suitably optimum rotary speed and optimum power delivery. The power delivery in that respect concerns that power which is fed into the electric grid. That power that the generator outputs in that case can be higher because for example losses are to be subtracted therefrom.

Accordingly such optimum operating points with an optimum rotary speed are predetermined for basically any wind speed for the respective turbine and operate the wind turbine in such a way that it works at its optimum operating point in dependence on the wind speed.

More and more frequently nowadays wind turbines also have to perform the task of supporting the electric grid into which they feed. For that purpose solutions are known from the state of the art, with which for example power regulation is additionally operated in frequency-dependent relationship. It is proposed for example that, with increasing grid frequency, the power that the wind turbine feeds into the grid is reduced as soon as the grid frequency has exceeded a limit value. In that way account is taken of a grid situation in which there is an excess energy supply, which leads to an increase in frequency by virtue of the behavior of large power stations.

Accordingly it is known from the state of the art to always operate the wind turbines in such a way that at their optimum operating point they feed as much power as possible into a grid, in which respect however that power can only be reduced to support the grid, and therefore operation deviates from the optimum operating point.

In order in that way to be able to operate a wind turbine with the highest possible yield at any locations a given structural design of the wind turbine is necessary to acquire a standard safety certification for operation that nowadays is an absolute necessity for an operating permit. It is however desirable, for the purposes of saving on material and thus to reduce the costs of the wind turbines, to keep down or even reduce the structural complexity in the design of the turbine. A standard safety certification for such wind turbines with structural savings which are afforded even at locations at which they are outside their design wind and turbulence class is however guaranteed when those wind turbines are operated at a reduced operating level. That means however that operation frequently becomes uneconomical.

On the German patent application from which priority is claimed the German Patent and Trade Mark Office searched the following documents: GB 2 484 266 A, US 2013/0 204 447 A1, US 2018/0 173 215 A1 and US 2018/0 187 648 A1.

BRIEF SUMMARY

Provided herein is operating a wind turbine with reduced structural design aspects economically at locations which lie outside their design wind and turbulence class.

Described herein is operation of a wind turbine in which a first signal is received, which is indicative of a level of remuneration for electrical energy which is fed currently and/or in the future into a grid to which the wind turbine to be operated is connected. The first signal is indicative of a level of remuneration, and therefore indicates the level of the remuneration. This means that the first signal includes for example data from which the level of the remuneration can be indirectly deduced, or which directly specifies the level of a remuneration. Thus the first signal includes for example an indication in eurocents per kilowatt or the like. In that respect the remuneration is indicated with the first signal for example for the current moment in time and alternatively or additionally for a future period or a predetermined period which extends into the future. In addition then a control signal is produced in dependence on that first signal and the wind turbine is controlled with the control signal to generate a power which is dependent on the control signal with the wind turbine.

By virtue of that control it is possible for the power that a wind turbine generates with a given wind to be controlled in dependence on the remuneration. It is possible in that way to dispense with a control in dependence on the wind speed. A wind turbine is subject to a certain degree of wear, wherein that wear increases comparatively more greatly precisely with an increasing wind speed. That means that the electricity generation costs increase with increasing speed, in particular when a fixed total service life is assumed to apply to the wind turbine. In addition a lower remuneration per kW is to be assumed to apply at high wind speeds than with low wind speeds, frequently by virtue of a high proportion of wind energy which is provided in the grids. The result of this is that the profit per kW/h in operation of a wind turbine that results from remuneration less power generation costs is substantially lower at high wind speeds than at low wind speeds.

By virtue of operating the wind turbine for example in the reduced mode of operation at high wind speeds at which a low remuneration is involved and that is indicated by the first signal the effects on the total profit from operation of a wind turbine are comparatively slight. Rather, the wind turbine can be operated more gently by operation which is reduced in that way, in such situations. That has a positive effect on the overall structural balance sheet in terms of the stresses involved so that in other situations, more specifically in particular when a high remuneration is announced, those reserves can be used in order for example to be able to operate the wind turbine in spite of involving a structural design for a lower level of loading without a reduction in power or even above an optimum operating point.

Overall wind turbines which by virtue of their structural component design are operated at locations outside their design class can thus be economically operated. More specifically they can acquire a standard safety certification if it can be demonstrated that on a regular basis the wind turbine is operated with a load reduction which is dependent on the first signal and thus leads to an averaged fatigue load or overall service life which is sufficient to acquire the standard safety certification.

According to a first embodiment control in dependence on the first signal with a control signal includes a change in the current operating point of a wind turbine and operation of the wind turbine with the changed operating point. That applies in particular if the level of a remuneration for electrical energy for a current moment in time is specified with the first signal. Additionally or alternatively the control signifies setting down a schedule with a time change in the operating point within a predefined period of time or a plurality of operating points for moments in time of the predefined period and operation of the wind turbine at operating points dependent on the schedule. That applies in particular if the level of a remuneration for electrical energy of a plurality of future moments in time, in particular for a period of time, is provided with the first signal. Accordingly it is then possible to establish operating points in accordance with a schedule for a predefined period of time, that period of time preferably coinciding with a period of time, for which the level of remuneration was received with the first signal, and the wind turbine can be operated in that period in accordance with the schedule.

An operating point here preferably describes a set of settings or setting values, in particular setting parameters, which are predetermined for the wind turbine in order to be able to operate it with those settings. The setting values or setting parameters are or include for example values for setting the blade angle and/or values for setting the exciter field of an externally excited generator for torque control and/or settings for an inverter and/or further components of a device of a wind turbine for feeding the electrical energy generated by the generator into a grid.

According to a further embodiment in addition at least one second signal is received, which is indicative of at least one factor for determining the current electricity generation costs of the wind turbine. Current electricity generation costs therefore correspond to operating point-dependent electricity generation costs. The electricity generation costs are also referred to as the Levelized Cost of Electricity or briefly LCOE. Electricity generation costs are the costs which are necessary for energy conversion which is implemented by the wind turbine. Factors for determining the current electricity generation costs include for example fixed and variable operating costs.

At least one of the factors is preferably a lifetime consumption of the wind turbine, that is to say there is associated with the wind turbine, over its entire service life, for example a value of a total service life, from which a lifetime consumption during operation is subtracted, and wherein it is assumed that, when that value has been counted down to zero, the service life of the wind turbine is exhausted. If different lifetime consumptions are determined or predetermined for the operating points, depending on the respective operating point, then the lifetime consumption can be taken into account as a factor in terms of electricity generation costs.

If for example the first signal indicates a particularly high remuneration, that is to say a comparatively high level of remuneration, but at the same time the second signal indicates an increased lifetime consumption then for example in spite of the high remuneration having regard also to the second signal the control can provide that operation of the wind turbine is reduced or less power is output and a corresponding control signal is produced. A lifetime consumption is specified for example as the consumption of lifetime hour equivalents per unit of time or per kilowatt hours. For example a lifetime consumption with a value 1 is a normal lifetime consumption while a value by way of example of 1.3 of the lifetime consumption indicates an increased lifetime consumption. The unit for the value is then for example lifetime hour equivalent/hour or lifetime hour equivalent/kilowatt.

A further factor can additionally be a residual lifetime which can be determined based on state monitoring, which is also referred to as "condition monitoring", or other measurements. Furthermore a factor can be the residual operating time which by virtue of the approval situation, ongoing project financings or a planned turbine shutdown, includes for example planned repowering.

In addition a factor includes for example expected wear which is expected for different operating points. In addition it is possible to take account of a factor which includes the costs involved for grid connection power of the wind turbine at different operating points. In accordance with this embodiment the control signal is then produced in dependence on the first signal and the second signal. Preferably then for example a control signal is produced, with which the power of the wind turbine is increased only when the ratio of the level of the remuneration to the current electricity generation costs is as high as possible and the power of the wind turbine is reduced only when the level of the remuneration is very low in relation to the current electricity generation costs. That takes account of the fact that a comparatively greater reduction in the power of the wind turbine is particularly appropriate when the current electricity generation costs are particularly high, and vice-versa.

In addition, in spite of a low comparative remuneration, in the situation where the electricity generation costs are also comparatively low by virtue of the operating point, it is possible to forego a power reduction. At the same time in the situation where comparatively high electricity generation costs are incurred by virtue of the current operating point even with a comparatively high level of remuneration, a power reduction can be appropriate.

According to a further embodiment the wind turbine has at least one operating characteristic. A control means of the wind turbine then sets operating points of the wind turbine, which lie on the operating characteristic. According to the embodiment however at least a region of the operating characteristic can be blocked. In the situation involving blocking of a region of the operating characteristic operating points in that blocked region cannot be set. If accordingly an operating point in a blocked region of an operating characteristic is to be set on the basis for example of prevailing wind conditions then the control means can only set an operating point below the blocked region or, if same is present, above the blocked region. Preferably the operating point is set, which is in the edge region of the blocked region and which is closest to a point to be set. Blocking and re-enabling of at least one region is effected in dependence on the first signal and preferably in dependence on the second signal. Preferably blocking or enabling is implemented by the control signal.

According to a further embodiment the wind turbine can be operated with at least two different operating characteristics. The operating characteristics are preferably stored in the wind turbine and include power-wind speed operating characteristics. This means that, in a situation where an operating characteristic is a power-wind speed operating characteristic, the operating characteristic preferably has operating points which are respectively associated with a wind speed and at which a respectively given electrical power is generated by the wind turbine. Those operating characteristics are preferably so selected that one of the operating characteristics corresponds to an optimum operating characteristic with optimum operating points. A second operating characteristic further corresponds to reduced operation at which operation with the operating points at the different wind speeds generates for example less energy than operation with the corresponding operating points on the optimum operating characteristic.

In addition at least one threshold value is stored or predefined and, in the situation where the first signal is indicative of remuneration at or above the threshold value, a control signal is produced to operate the wind turbine with the first of the two operating characteristics. In the situation where the first signal indicates remuneration below the threshold value a control signal is produced to operate the wind turbine with a second of the two operating characteristics Particularly preferably a third or further operating characteristics can also be stored, which for example include operating points which in comparison with the first operating characteristic include operating points which, with a corresponding wind speed, generate a higher level of power in operation than in operation with the optimum operating characteristic. That particularly simplifies control of the wind turbine.

According to a further embodiment the first and second signals are received by a central control (central controller). The central control is for example a control center of a plurality of wind turbines or a control system connected upstream of the control center of the wind turbines. Control signals for respective ones of a plurality of wind turbines are produced in the central control and passed to the respective one of the plurality of wind turbines in order to control the plurality of wind turbines with the control signals in such a way that they produce a power dependent on the control signal. Accordingly a higher-level system, in dependence on the prevailing remuneration which that higher-level system knows by means of the first signal, can determine which of the controllable wind turbines is to be or can be operated for example in a reduced mode and which of the controllable wind turbines for example is further operated at the optimum operating point.

In a further embodiment a second signal is respectively produced in each of the wind turbines and transmitted to the central control. Alternatively or additionally at least one factor for determining the current electricity generation costs of a wind turbine is transmitted from the wind turbine to the central control in order in that way to produce the second signal for the wind turbine with the central control itself.

According to an embodiment the central control can decide which of a plurality of wind turbines for example is to be treated with care, that is to say for example is to generate a comparatively lower power level in dependence on a comparatively low remuneration and is thus operated in a throttled mode. Wind turbines which for example are in any case shortly before the end of their service life and still have an adequate service life in accordance with a lifetime consumption display can thus for example be stressed more greatly than other wind turbines.

According to a further embodiment the central control produces control signals such that a wind turbine with currently low electricity generation costs in comparison with another wind turbine generates higher power than the other wind turbine.

According to a further embodiment as an alternative to the above-described reception of the first signal by the central control for producing the control signals in the central control the first signal is received by means of the wind turbine. The second signal is generated by an evaluation circuit of the wind turbine and then control signals are produced with the wind turbine itself in order to control same in such a way that it generates power dependent on the respective control signal. A higher-level central control is accordingly not required.

According to a further embodiment the control signal is produced in such a way that an operating point is maintained after a change, preferably for a predefined period of time of at least an hour, at least 30 minutes or at least 10 minutes, in particular 15 minutes, even if the first signal changes within the period of time. That prevents the operating point of a wind turbine being constantly changed in spite of fluctuating remuneration levels.

According to a further embodiment the control signal is produced in such a way that an operating point changes only when the first signal changes by more than a predefined second threshold value. Here too account is taken of the fact that the operating point of the wind turbine does not have to be constantly changed in spite of constant wind conditions.

According to a further embodiment a third signal is received either by the central control or by the wind turbine itself that is indicative of a weather forecast. A control signal is then produced in dependence on the first signal, the second signal and the third signal. This therefore takes account of the fact that no schedules are laid down on the basis of the first signal for wind turbines which for example cannot be observed by virtue of the prevailing wind conditions.

In addition, provided herein is a wind turbine adapted to carry out a method according to one of the above-mentioned embodiments. In particular the wind turbine is adapted to produced or receive a control signal which is dependent on a first signal. In that respect, as already stated hereinbefore, the first signal is indicative of a level of remuneration for electrical energy, which is fed currently and/or in the future into a grid to which the wind turbine can be connected. In addition the wind turbine is adapted to produce power dependent on the control signal.

Provided herein is central control adapted to carry out a method according to one of above-described embodiments. In particular the central control serves to produce control signals for a plurality of wind turbines according to the above-mentioned embodiments. With the central control, a first signal is received which is indicative of a level of remuneration for electrical energy which is fed currently and/or in the future into a grid to which the wind turbines are respectively connected. In addition the central control is adapted to control the respective wind turbines with a control signal dependent on the first signal.

In addition, provided herein is a system having a central control according to one of the above-mentioned embodiments and a wind turbine according to one of the above-mentioned embodiments.

BRIEF DESCRIPTION OF THE SEVERAL VIEWS OF THE DRAWINGS

Further configurations will be seen from the embodiments by way of example which are described in greater detail with reference to the Figures.

DETAILED DESCRIPTION

Figure 1:
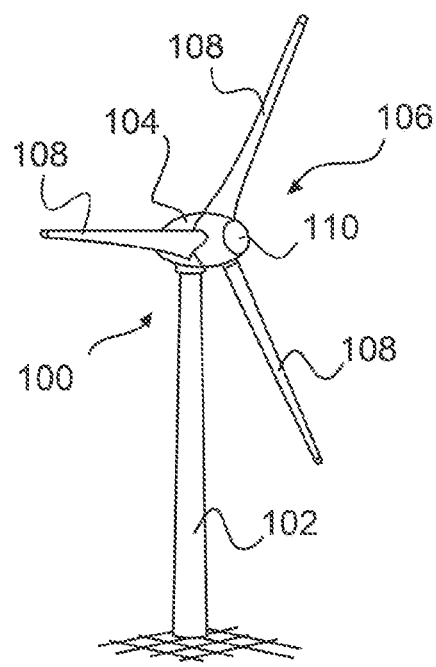
FIG. 1 shows a wind turbine.

FIG. 1 shows a diagrammatic view of a wind turbine. The wind turbine 100 has a tower 102 and a nacelle 104 on the tower 102. Provided on the nacelle 104 is an aerodynamic rotor 106 having three rotor blades 108 and a spinner 110. The aerodynamic rotor 106 is driven in rotation in operation of the wind turbine by the wind and thus also rotates an electromagnetic rotor or rotor member of a generator which is directly or indirectly coupled to the aerodynamic rotor. The electric generator is arranged in the nacelle 104 and generates electrical energy. The pitch angles of the rotor blades 108 can be altered by pitch motors at the rotor blade roots of the respective rotor blades 108.

Figure 2:
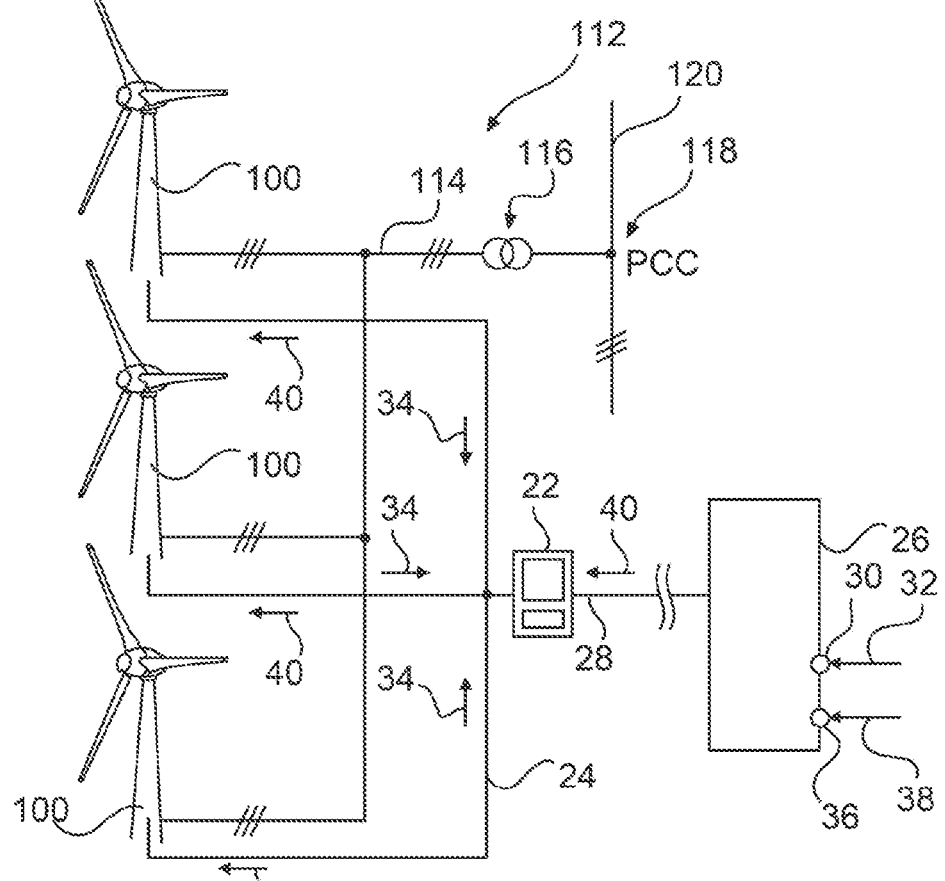
FIG. 2 shows a plurality of wind turbines connected to a central control.

FIG. 2 shows a wind farm 112 having by way of example three wind turbines 100 which can be the same or different. The three wind turbines 100 are thus representative of basically any number of wind turbines 100 in a wind farm 112. The wind turbines 100 provide their power, more specifically in particular the current generated, by way of an electrical farm grid 114. In that respect the respectively generated currents or powers of the individual wind turbines 100 are added up and there is generally provided a transformer 116 which steps up the voltage in the farm in order then to feed it into the supply grid, or referred to for brevity as the grid 120, at the feed point 118 which is also generally referred to as the PCC.

In addition each of the wind turbines 100 is connected to a wind farm controller 22 by way of a data line 24. Data can be transmitted by way of the data line 24 between the wind turbines 100 and the wind farm controller 22, in both directions, that is to say from the wind turbine 100 to the wind farm controller 22 and from the wind farm controller 22 to the wind turbine 100. The wind farm controller 22 is in turn connected to a central control (central controller) 26 by way of a further data line 28.

In the present case in FIG. 2 the central control 26 is only connected to the illustrated wind farm 112, wherein preferably the central control 26 is connected to and controls a plurality of wind farms 112. By way of the data line 28 the central control 26 can also transmit data to the wind farm controller 22 and the wind farm controller 22 can transmit data to the central control 26, that is to say in both directions, namely bidirectionally. The central control 26 also has a first input 30 to which a first signal 32 or a plurality of first signals 32 is or are fed. The first signal 32 specifies the level of a remuneration for electrical energy which is fed currently and/or in the future into the grid 120 to which the wind turbines 100 are connected. A plurality of first signals 32 serve for example to specify the respective remuneration for the energy when a plurality of wind farms 112 which for example are connected to different grids 120 are controlled by the central control 26. Here then each first signal 32 is provided for the wind turbines 100 of the respective wind farm 112.

In additional the central control 26 is adapted to receive a second signal 34 from each of the wind turbines 100 of the illustrated wind farm 112, by way of the data line 24 and the further data line 28, being therefore forwarded by way of the wind farm controller 22, that signal being indicative of at least one factor for determining the current electricity generation costs of the respective wind turbine 100. The central control 26 also has a further input 36, by way of which a third signal 38 can be received. The third signal 38 is indicative of a weather forecast. Preferably a third signal 38 includes a plurality of weather forecasts for various regions in which, in the event that a plurality of wind farms 112 are connected to the central control 26, they are located. It is however also possible for a specific third signal 38 to be received for each wind farm 112 irrespective of its location. As an alternative to the illustrated embodiment the first input 30 and the further input 36 can also be in the form of a single input.

The central control 26 which in this respect can also be in the form of a control center but also in the form of a part of the farm control in the form of a decentralized system is adapted, in dependence on the first signal 32 or in dependence on the first signal 32 and the second signal 34 or in dependence on the first signal 32 and the second signal 34 and the third signal 30 or in dependence on the first signal 32 and the third signal 38 to produce and then output a control signal 40 for actuating all wind turbines 100 of the wind farm 112 or each of the wind turbines 100 separately. The control signal or signals 40 are then suitably fed by way of the further data line 28 and the data line 24, that is to say again by way of the farm controller 22, to the or a respective one of the corresponding wind turbines 100. The control signal 40 serves for control of the wind turbine so that the wind turbine generates energy which is dependent on the control signal. Preferably the control signal 40 serves for controlling one or more wind turbines 100 by adjusting an operating point, dependent on the control signal 40, of the wind turbine 100 or wind turbines 100 so that therefore a current operating point of the wind turbine or turbines 100 changes to another operating point dependent on the control signal 40. An operating point defines for example a blade setting angle or a blade angle change and/or control of the exciter voltage of the generator of the wind turbine 100. Thus, in dependence on the control signal 40, more specifically in particular by changing the operating point, even with the wind remaining the same, it is possible to change the electrical energy generated with the wind turbine 100. The wind turbines 100 of the wind farm 112 are thus controlled in particular in dependence on the first signal 32 that is to say in dependence on the level of a remuneration.

In an embodiment which is not illustrated here the above-indicated functions of the central control 26 are performed in the wind farm controller 22. For that purpose the wind farm controller 22 has inputs for receiving the first signal 32 and in particular the second signal 34 or itself producing same for the wind turbines 100 controlled by the wind farm controller 22. The wind farm controller 22 then produces control signals 40 for the wind turbines 100 in dependence on the first signal 32 and preferably in dependence on the second signal 34.

Figure 3:
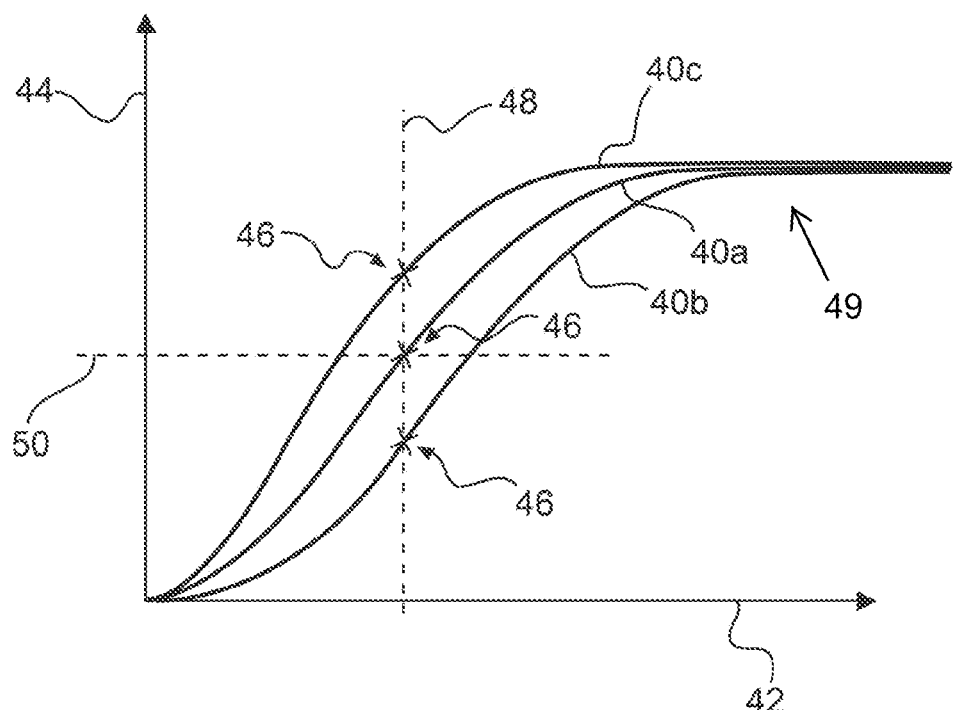
FIG. 3 shows a plurality of operating characteristics of a wind turbine.

FIG. 3 shows three operating characteristics 40a, 40b, 40c. The operating characteristics 40a, 40b, 40c associate a respective power output 44 with a wind speed 42. Each of the operating characteristics 40a through 40c includes a plurality of operating points 46. This means that the wind turbine which is operated for example with an optimum operating characteristic 40a, at a wind speed 42 represented by the vertical broken line 48 generates a power output 50 shown by the horizontal broken line 50.

At the operating point 46 which is shown on the optimum operating characteristic 40a pre-defined blade setting angles and/or exciter field settings are suitably stored for the operating point. From that operating point 46 on the operating characteristic 40a which can also be referred to as the first operating characteristic it is possible for example to switch over to a further operating point 46 on the further or second operating characteristic 40b. The operating point 46 which is on the operating characteristic 40b for example involves a different blade setting angle or a different setting for the exciter field.

Thus in dependence on the first signal which specifies the level of remuneration it is easily possible to switch between the operating points 46 on the operating characteristic 40a through 40c. In the present example three operating characteristics are shown, but in accordance with another embodiment a plurality of operating characteristics is stored, which are each associated with a respective remuneration level and can be selected in dependence on a remuneration level which is indicated by the first signal. Alternatively, in accordance with a further embodiment (not shown here) only at least one operating characteristic 40a is stored, wherein regions 49 of the operating characteristic 40a of higher power output can be deactivated or blocked off or a power limitation effect can be activated. The case does not involve storing a plurality of characteristics but the characteristic is divided into a plurality of regions, wherein the regions of higher power output are optional and can be switched on or off or blocked and re-enabled in dependence on the first signal 32.

Figure 4:
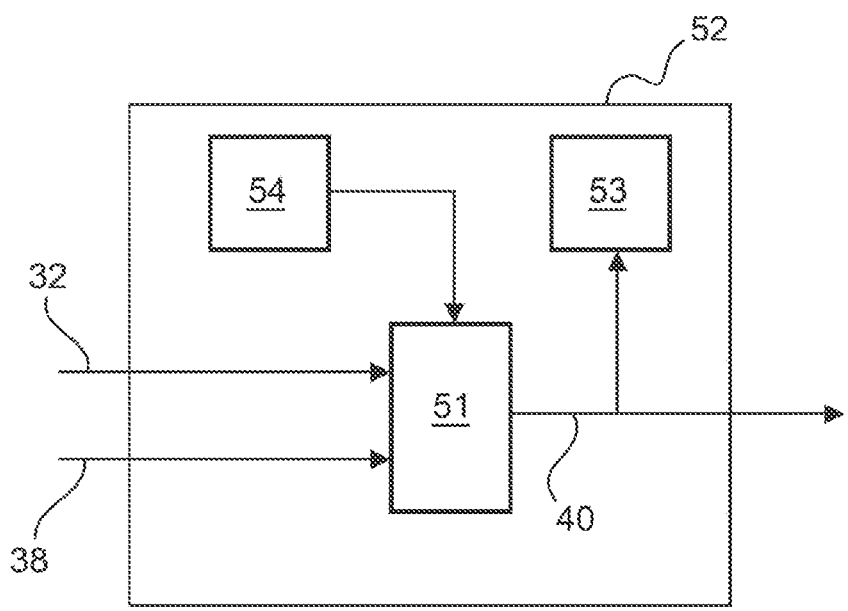
FIG. 4 shows the control of a wind turbine.

FIG. 4 shows a control (controller) 52 of a wind turbine which for example is controlled independently of a central control 26 according to the method. The control (controller) 52 receives the first signal 32 which indicates the level of a remuneration and optionally the third signal 38 which contains the weather forecast data. In addition the control 52 includes an evaluation circuit 54 which generates the second signal 34. In dependence on the three signals a control signal 40 for controlling the wind turbine is thus produced with a control signal producing unit 51 of the control 52. That control signal 40 can be used for example in the control 42 directly in an operating point setting unit 53 to control the power output of the wind turbine with a given wind, more specifically by the selection of an operating point 46.

Figure 5:
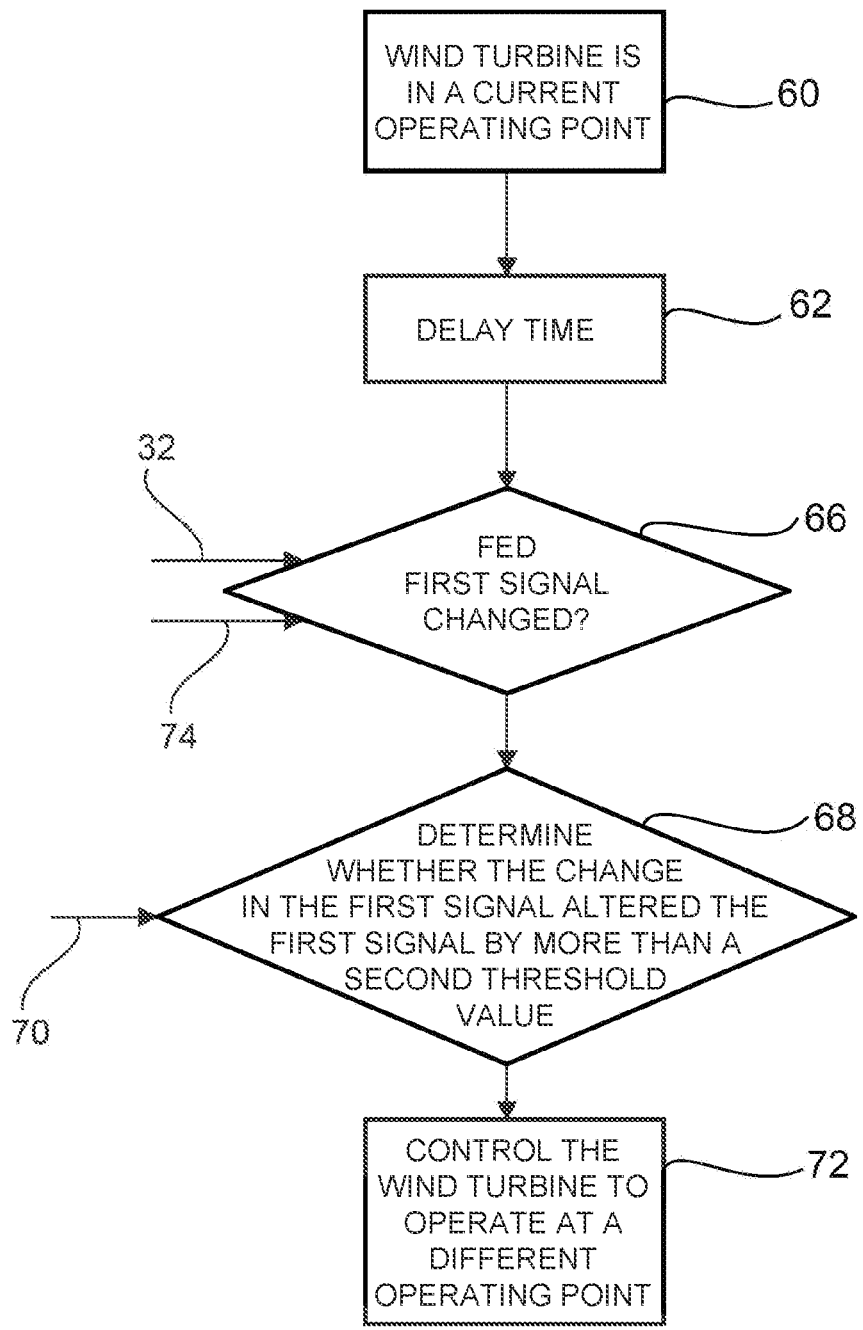
FIG. 5 shows the steps in the method according to an embodiment.

FIG. 5 shows the steps in an embodiment of the method. In a step 60 the wind turbine is in a current operating point 46. After a delay time 62 to which a period 64 can be supplied a check is made in a decision step 66 to ascertain whether a fed first signal 32 has changed. If the first signal 32 has not changed then the method goes to step 60 again and the wind turbine 100 continues to be driven at the current operating point 46. If the first signal 32 has changed a check is made in a next decision step 68 to ascertain whether the change in the first signal 32 has altered by more than a second threshold value 70. If that is not the case then the wind turbine is again further operated using the current operating point 46. If however the first signal 32 has changed by more than the second threshold value 70 the wind turbine 100 is controlled in such a way that the wind turbine 100 is operated at a different operating point in step 72.

Alternatively, a threshold value 74 can additionally be added in the checking operation in step 66. A change in the first signal 32 is detected only when the first signal 32 has changed in such a way that it has exceeded the threshold value 74 once, either from a lower value to an upper value or from an upper value to a lower value.

The invention claimed is:

1. A method of operating a wind turbine, comprising:
receiving a first signal indicative of a remuneration of electrical energy currently fed and/or to be fed into a grid, wherein the wind turbine is coupled to the grid; and
generating a control signal based on the first signal; and
controlling the wind turbine using the control signal for generating power based on the control signal, wherein controlling the wind turbine includes:
storing a schedule specifying a plurality of different operating points of the wind turbine for a plurality of different time periods, respectively, the plurality of different time periods being in a pre-defined period of time, and each operating point of the plurality of different operating points representing a setting of the wind turbine that is dependent on wind speed; and
operating the wind turbine per the plurality of different operating points specified by the schedule,
wherein an operating point of the wind turbine changes in response to the first signal changing by more than a pre-defined second threshold value, and the operating point of the wind turbine does not change in response to the first signal changing by less than the pre-defined second threshold value.

2. The method as set forth in claim 1, comprising:
receiving at least one second signal indicative of at least one factor for determining current electricity generation costs of the wind turbine; and
producing the control signal based on the first signal and the at least one second signal.

3. The method as set forth in claim 2, comprising:
setting operating points of at least one operating characteristic of the wind turbine; and
refraining from using at least one region of the at least one operating characteristic to prevent operating points in the at least one region from being set, wherein refraining from using the at least one region is performed based on the first signal or the first signal and the at least one second signal.

4. The method as set forth in claim 2, comprising:
receiving, by a second controller different than a central controller, the first signal and the at least one second signal; and
generating, by the central controller, wind turbine control signals for a plurality of wind turbines, respectively, and transmitting the wind turbine control signals to the plurality of wind turbines, respectively, to respectively control the plurality of wind turbines with the wind turbine control signals such that the plurality of wind turbines generate power dependent on the respective wind turbine control signals.

5. The method as set forth in claim 4, comprising:
generating, by the wind turbine, the at least one second signal and transmitting, from the wind turbine to the central controller, the at least one second signal; or
transmitting, from the wind turbine to the central controller, the at least one factor for determining the current electricity generation costs of the wind turbine, and generating, by the central controller, the at least one second signal for the wind turbine based on the at least one factor.

6. The method as set forth in claim 4, wherein a first wind turbine of the plurality of wind turbines having present lower electricity generation costs than a second wind turbine of the plurality of wind turbines generates a higher power output than the second wind turbine.

7. The method as set forth in claim 2, comprising:
receiving, by the wind turbine, the first signal;
generating, by a controller of the wind turbine, the at least one second signal; and
generating, by the wind turbine, internal control signals for use within the wind turbine and to control operation of the wind turbine such that the wind turbine produces a power output dependent on the control signal.

8. The method as set forth in claim 2, comprising:
receiving a third signal indicative of a weather forecast; and
producing the control signal based on the first signal, the at least one second signal and the third signal.

9. The method as set forth in claim 2, wherein:
the at least one factor represents a lifetime consumption, a residual lifetime and/or a residual operating time of the wind turbine, wear that the wind turbine is expected for different operating points, respectively and/or costs respectively associated with different operating points for grid connection power of the wind turbine.

10. The method as set forth in claim 1, comprising:
operating the wind turbine using at least two different operating characteristics including power-wind speed operating characteristics, and a threshold value for the wind turbine;
in response to the first signal indicating that the remuneration is greater than or equal to the threshold value, operating, using the control signal, the wind turbine with a first of the at least two different operating characteristics; and
in response to the first signal indicating that the remuneration is below the threshold value, operating, using, the control signal, the wind turbine with a second of the at least two different operating characteristics.

11. The method as set forth in claim 1, comprising:
generating the control signal such that, in response to a change in the first signal within a period of time, an operating point is maintained without change.

12. The method as set forth in claim 11, wherein the period of time is at least one hour, at least 30 minutes, at least 10 minutes or 15 minutes.

13. A wind turbine, comprising:
a controller configure to:
generate or receive a control signal dependent on a first signal, the first signal being indicative of a remuneration for electrical energy currently fed and/or to be fed into a grid, wherein the wind turbine is coupled to the grid, wherein:
the wind turbine is configured to generate a power output based on the control signal,
a schedule specifying a plurality of different operating points of the wind turbine for a plurality of different time periods, respectively, is stored, and
the plurality of different time periods are in a pre-defined period of time, and each operating point of the plurality of different operating points represents a setting of the wind turbine that is dependent on wind speed; and
operate the wind turbine per the plurality of different operating points specified by the schedule,
wherein an operating point of the wind turbine changes in response to the first signal changing by more than a pre-defined second threshold value, and the operating point of the wind turbine does not change in response to the first signal changing by less than the pre-defined second threshold value.

14. A central controller, configured to:
receive a first signal indicative of a remuneration of electrical energy currently fed and/or to be fed into a grid, wherein a plurality of wind turbines are respectively connected to the grid;
generate control signals for the plurality of wind turbines, respectively, based on the first signal; and
control the plurality of wind turbines using the control signals, wherein:
a schedule specifying a plurality of different operating points of the wind turbine for a plurality of different time periods, respectively, is stored, and
the plurality of different time periods are in a pre-defined period of time, and each operating point of the plurality of different operating points represents a setting of the wind turbine that is dependent on wind speed; and
operate the wind turbine per the plurality of different operating points specified by the schedule,
wherein an operating point of the wind turbine changes in response to the first signal changing by more than a pre-defined second threshold value, and the operating point of the wind turbine does not change in response to the first signal changing by less than the pre-defined second threshold value.

15. A system comprising:
the central controller as set forth in claim 14; and
the plurality of wind turbines.

* * * * *